June 28, 1932.  P. F. GRUVER  1,865,100
BEARING
Filed May 20, 1930
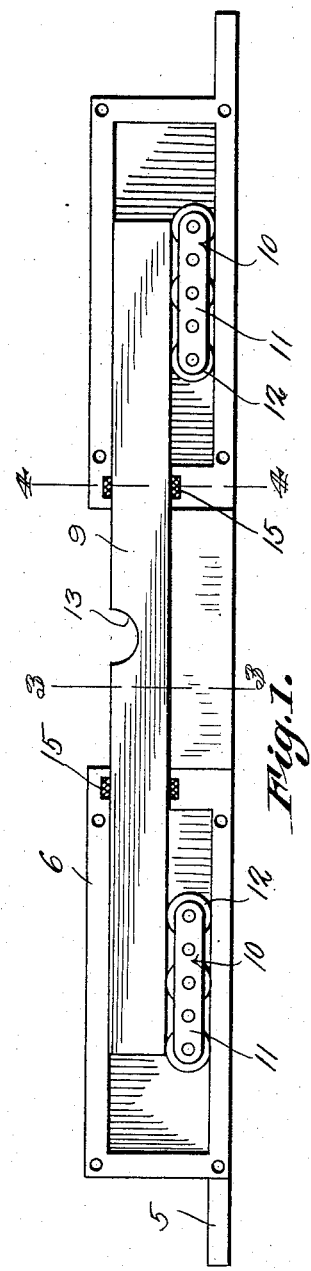
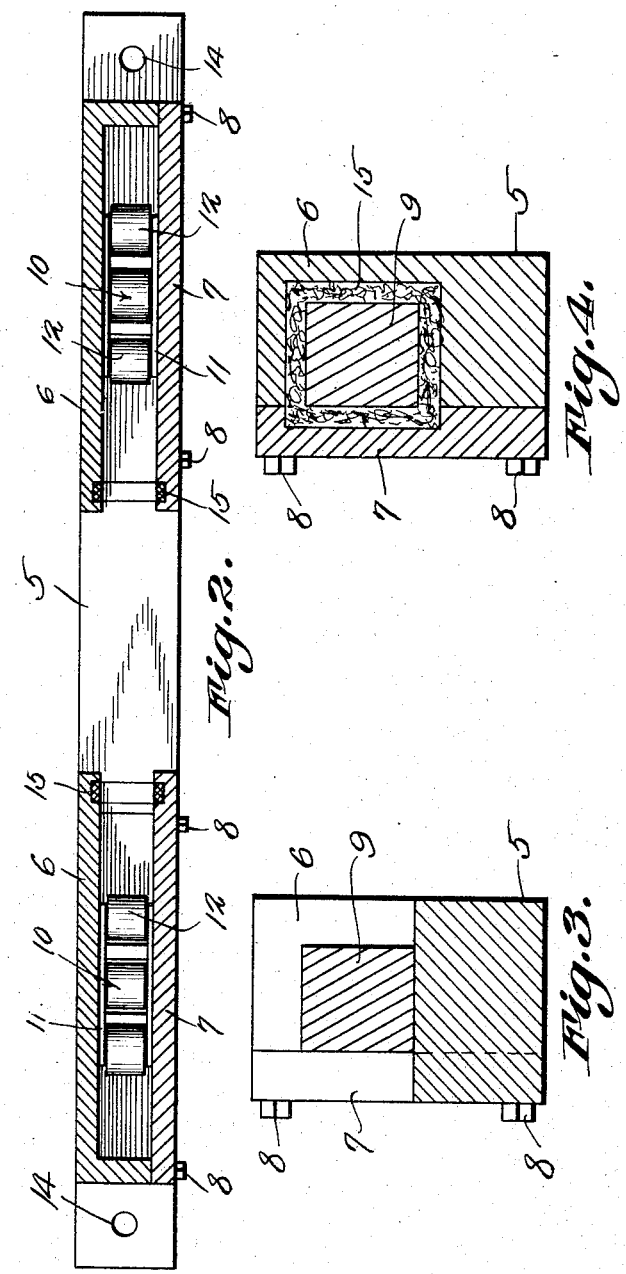
Perry F. Gruver
Inventor
By C. A. Snow & Co.
Attorneys.

Patented June 28, 1932

1,865,100

UNITED STATES PATENT OFFICE

PERRY F. GRUVER, OF GRUVER, TEXAS

BEARING

Application filed May 20, 1930. Serial No. 454,083.

This invention has reference to bearing construction, and more particularly to bearings designed for use in connection with supporting shafts of reciprocating machinery, the primary object of the invention being to provide a pair of roller bearings operating in housings, a supporting shaft positioned on the roller bearings, and a shaft mounted on the supporting shaft to move therewith, thereby providing an exceptionally solid foundation for the shaft supported by the bearings.

Another important object of the invention is to provide means whereby a fluid tight connection will be insured between the supporting shaft mounted on the bearings, and the housings into which the supporting shaft extends.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a bearing constructed in accordance with the invention, the side plates of the bearing housings being removed.

Figure 2 is a longitudinal sectional view through the bearing.

Figure 3 is a sectional view taken on line 3—3 of Figure 1.

Figure 4 is a sectional view taken on line 4—4 of Figure 1.

Referring to the drawing in detail, the reference character 5 designates the supporting plate of the bearing, the supporting plate being substantially long to permit of the necessary movement of the supporting bar, to be hereinafter more fully described, and which forms a part of the bearing proper.

The reference character 6 designates bearing housings that are formed integral with the plate 5, and disposed adjacent to the ends thereof, the housings being provided with removable side plates 7 that are bolted in position by means of the bolts 8.

Openings are formed in the inner end walls of the housings 6, the openings being rectangular in formation to receive the rectangular supporting bar 9 which has its ends resting on the movable bearing members 10 that move throughout the lengths of the housings 6.

A groove is formed in the inner surface of each housing, adjacent to the rectangular opening thereof, the groove being provided to receive the packing material 11 that closely engages the bar 9, to provide a fluid tight connection between the housing and bar 9, to the end that the bearings 10, may operate in oil, thereby reducing wear to the minimum.

Grooves are also formed in the plates 7, the grooves of the plates registering with the grooves in the walls of the housings to accommodate the packing. Each of the bearing members 10 comprises bars 11 between which the rollers 12 are mounted, the bars 11 being of lengths so that the bearing members 10 may move appreciable distances within the housings. The widths of the bearing members 10 are such that they will closely fit within the housings in such a way as to insure against lateral movement of the bearing members while in use.

The supporting bar 9 is formed with a recess 13 to accommodate one end of a bar that moves with the bar 9, for receiving motion therefrom. It might be further stated that in the use of the device, it is contemplated to employ a pair of supporting plates 5 that are provided with housings, the supporting plates and housings being arranged in parallel spaced relation with each other so that the ends of the shaft or bar associated with the bar 9, may rest in the recesses 13 and be supported thereby.

Openings 14 are formed in the ends of the plate 5, and receive suitable securing bolts whereby the bearings may be secured in position.

I claim:

1. A shaft bearing comprising in combination, a supporting plate, an elongated bearing housing disposed at each end of the plate, roller bearing members of widths to closely fit between the walls of the housing, a supporting bar, the ends of the supporting bar extending into the housing and resting on the bearing members, and said bar having a recess to receive the end of a shaft.

2. A shaft bearing comprising in combination, a supporting plate, housings formed integral with the plate, the adjacent ends of the housings being open, bearings operating in the housings, a supporting bar, the ends of the supporting bar extending into the open ends of the housings, and resting on the bearings, and said supporting bar having a cut out portion disposed intermediate its ends, to receive a shaft.

In testimony that I claim the foregoing as my own, I have hereto affixed my signature.

PERRY F. GRUVER.